April 8, 1958  F. REYNAUD ET AL  2,829,966
PROCESS OF ACIDIC ATTACK OF ARSENIURETED ORES, PARTICULARLY
OF COBALT AND/OR OF NICKEL
Filed April 19, 1956
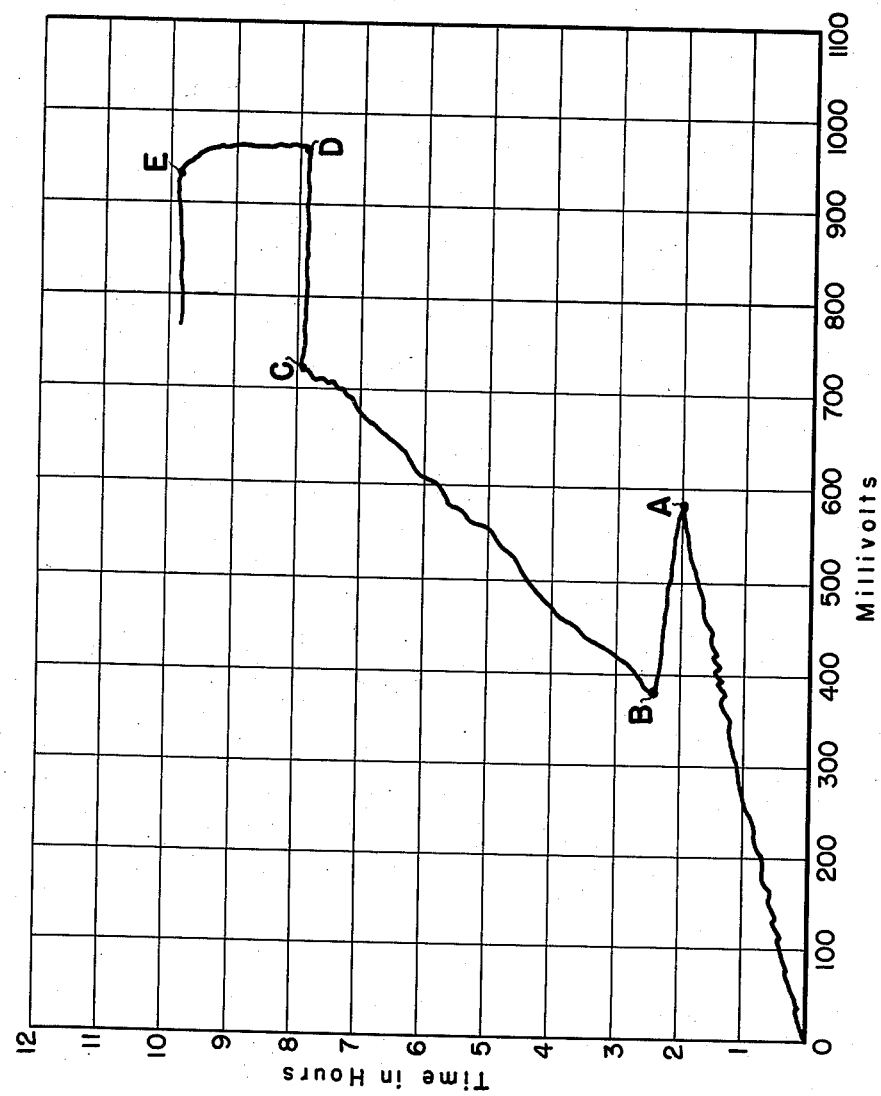
INVENTORS.
Francis Reynaud
Guy Gravey
Andre Roth
BY Webb, Mackey & Burden
THEIR ATTORNEYS 2,829,966
Patented Apr. 8, 1958

2,829,966

PROCESS OF ACIDIC ATTACK OF ARSENIURETED ORES, PARTICULARLY OF COBALT AND/OR OF NICKEL

Francis Reynaud, Guy Gravey, and André Roth, Pombliere, France, assignors to Societe d'Electro-Chimie d'Electro-Metallurgie et des Acieries Electriques d'Ugine, Paris, France, a corporation of France Application April 19, 1956, Serial No. 579,175

7 Claims. (Cl. 75—112)

This invention relates to a process for treating ores containing arsenic and various metals among which one at least is cobalt, nickel, iron, or gold.

According to one mode of carrying out the process, chlorine gas is diffused into an aqueous suspension of crude arseniureted ore maintained at a temperature not above 80° C. until most of the arsenic has been oxidized into arsenic acid and dissolved and most of the metals cobalt, nickel and iron in the crude ore have been oxidized and dissolved, principally into metal chlorides. Thereafter, previously roasted arseniureted ore is added to the suspension and the temperature of the suspension is raised to 80–100° C., preferably 90–95° C. The diffusion of chlorine gas into the suspension is continued until substantially all of the arsenic, cobalt, nickel, iron and gold, if any, in the crude and roasted ores have been dissolved.

According to another mode of carrying out the process, chlorine gas is diffused into an aqueous suspension of a mixture of crude arseniureted ore and previously roasted arseniureted ore maintained at a temperature not above 80° C. until most of the cobalt, nickel and iron in the mixture has been oxidized and dissolved, principally into metal chlorides and until most of the arsenic in the mixture has been oxidized and dissolved, partially into arsenious acid and partially into arsenic acid. Thereafter, the temperature of the suspension is raised and the diffusion of chlorine gas into the suspension is continued until substantially all of the arsenic, cobalt, nickel, iron and gold, if any, in the mixture have been dissolved.

In the accompanying drawing which illustrates the preferred embodiment of our invention, the single figure is a typical curve representing the oxidation potentials of an ore suspension during the course of treatment of crude arseniureted and previously roasted arseniureted ores according to the preferred mode of operation, the abscissas designating millivolts and the ordinates designating time in hours.

When chlorine gas and water react, hypochlorous acid and hydrochloric acid are formed according to the following equation:

(1) $$Cl_2 + H_2O \rightleftharpoons HClO + HCl$$

Smaltine is an example of an arseniureted ore which can be employed according to our invention. It is a complex varying mixture of numerous minerals such as $CoAs_2$, $CoAs_3$, $(Co, Ni)As_2$, $(Co, Ni, Fe)As_3$ and $FeAs_2$.

If chlorine is diffused into an aqueous suspension of smaltine or other arseniureted ore and the suspension is maintained at a temperature of not above 80° C., the following reactions occur:

(2)
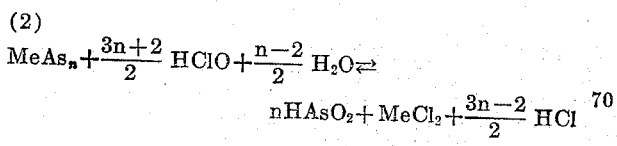

("Me" represents particularly cobalt, nickel or iron or a mixture of these metals.)

(3) $$HAsO_2 + HClO + H_2O \rightarrow H_3AsO_4 + HCl$$

As shown by Equation 2, the hypochlorous acid oxidizes the metal arsenides to arsenious acid ($HAsO_2$), converts the metal arsenides to metal chlorides and hydrochloric acid is formed.

According to Equation 3, hypochlorous acid and water react with arsenious acid to form orthoarsenic acid and hydrochloric acid. Thus, hydrochloric acid is formed when chlorine is diffused into an aqueous suspension of arseniureted ore maintained at a temperature not above 80° C. According to the present invention, the hydrochloric acid thus formed is utilized to solubilize the oxidized elements in a previously roasted arseniureted ore.

Whether the chlorine gas is diffused first into an aqueous suspension of the crude ore and the roasted ore is thereafter added to the suspension or whether the chlorine gas is diffused into an aqueous suspension of a mixture of crude ore and roasted ore, it is preferred that the proportions of crude ore and roasted ore be such that the amount of hydrochloric acid formed by the action of chlorine on the crude ore corresponds substantially to the amount of hydrochloric acid required to solubilize the oxidized elements in the roasted ore.

The preferred mode of carrying out the invention is as follows.

Raw smaltine (crude arseniureted ore) may contain, for example:

| | |
|---|---|
| Co | percent__ 11.4 |
| Ni | do____ 1.18 |
| As | do____ 52.5 |
| Fe | do____ 9.0 |
| Au | g./metric ton__ 5 |

The arseniureted ore is suspended in water. Because this ore does not contain arsenic and iron in a ponderal ratio of about 1, iron, preferably in the form of ferrous sulphate, $FeSO_4 \cdot 7H_2O$, is added to the suspension in which it dissolves or is mixed with the ore before it is added to the water to form the suspension. The amount of iron added is such as to bring the ponderal ratio of arsenic to iron to about 1 after addition of roasted ore at the end of oxidation. If the ponderal ratio of arsenic to iron in the ore is approximately 1, no iron is added.

Chlorine is then diffused into the suspension, the rate of input of the chlorine being such that the temperature of the suspension does not rise to a value above 80° C. The oxidation potential of the suspension is measured continuously during the diffusion of chlorine into the suspension. The method of measuring the oxidation potential by means of a chain of platinum-saturated calomel electrodes is described in detail in application Serial No. 579,173, filed April 19, 1956. When the oxidation potential of the slurry reaches a value of about 600 millivolts, about 85% of the crude ore has been solubilized and the operation has lasted about 2 hours. At this stage of the operation, which is represented by point A on the curve, roasted smaltine (previously roasted arseniureted ore) is added to the suspension. The roasted ore may contain, for example:

| | |
|---|---|
| Co | percent__ 17.7 |
| Ni | do____ 1.25 |
| As | do____ 15.80 |
| Fe | do____ 13.00 |
| Au | g./metric ton__ 12 |

The addition of the roasted ore lowers the oxidation potential of the suspension as represented by point B on the curve. The temperature of the suspension is then raised to a value within the range 80–100° C., preferably to 90–95° C. and the diffusion of chlorine gas is continued until substantially all of the arsenic, cobalt, nickel and iron in the crude and roasted ores have been dissolved but gold has not yet been dissolved. This stage is represented on the curved by point C. The diffusion of chlorine is continued and the oxidation potential rapidly rises to about 1000 millivolts, point D of the curve, and chlorine diffusion is continued to maintain the oxidation potential at about this value in order to dissolve the gold. At point E of the curve, substantially all of the gold has been dissolved. The solution is then neutralized to bring it to a pH value suitable for precipitating ferric arsenate which is then removed from the solution. The filtrate containing cobalt, nickel and gold is then treated to separate these metals. These latter steps are described more fully in the above mentioned application.

The following example further illustrates our process.

*Example*

600 kgs. of raw smaltine (crude arseniureted ore) having the composition similar to that previously recited and 1850 kgs. of ferrous sulphate ($FeSO_4 \cdot 7H_2O$) were suspended in 5 cubic meters of water. Chlorine gas was then diffused into the suspension and the rate of input was controlled so that the temperature did not exceed 80° C. At the end of 2 hours, the oxidation potential had risen to about 600 millivolts (point A of the curve). About 85% of the raw smaltine had been solubilized.

4,000 kgs. of roasted smaltine (previously roasted arseniureted ore) of the composition similar to that previously recited were added to the suspension whose potential was then represented by point B of the curve. The diffusion of chlorine was continued and the temperature was maintained at 90–95° C. until point C of the curve had been reached, at which point substantially all of the arsenic, cobalt, nickel and iron in the crude ore and roasted ore had been dissolved. The slurry was then further treated by neutralization, as previously explained and as set forth in the above referred to patent application, to precipitate the iron and arsenic as ferric arsenate. The other metals, such as cobalt, nickel and gold, were recovered from the solution.

5 metric tons of dry residue containing 0.27% cobalt were obtained when the ferric arsenate was precipitated. This cobalt was composed of the undissolved cobalt and the cobalt adsorbed by the iron arsenate. The yield of cobalt in the solution was 98.3%.

The invention is not limited to the preferred embodiment but may be otherwise embodied or practiced within the scope of the following claims.

We claim:

1. A process for treatment of arseniureted ores containing various metals with at least one from the group consisting of cobalt, nickel, iron, and gold, which consists essentially of diffusing chlorine gas into an aqueous suspension of crude arseniureted ore maintained at a temperature less than 80° C. until most of the arsenic and most of the metals in the crude ore have been dissolved, thereafter adding previously roasted arseniureted ore to the suspension and raising the temperature of the suspension to a value between 80–100° C. hydrochloric acid being formed by the action of the chlorine on the crude ore and the proportions of crude ore and roasted ore are such that the amount of hydrochloric acid formed by the action of the chlorine on the crude ore corresponds substantially to the amount of hydrochloric acid required to solubilize any oxidized elements in the roasted ore, and continuing the diffusion of chlorine gas until substantially all of the arsenic and metals in the crude and roasted ores have been dissolved.

2. A process for treatment of arseniureted ores containing various metals with at least one from the group consisting of cobalt, nickel, iron, and gold, which consists essentially of diffusing chlorine gas into an aqueous suspension of a mixture of crude arseniureted ore and previously roasted arseniureted ore maintained at a temperature less than 80° C. until most of the arsenic and most of the metals in the mixture have been dissolved, thereafter raising the temperature of the suspension to a value between 80–100° C. and continuing the diffusion of chlorine gas until substantially all of the metals in the mixture have been oxidized and dissolved and substantially all of the arsenic has been oxidized into arsenic acid and dissolved hydrochloric acid being formed by the action of the chlorine on the crude ore and the proportions of crude ore and roasted ore are such that the amount of hydrochloric acid formed by the action of the chlorine on the crude ore corresponds substantially to the amount of hydrochloric acid required to solubilize any oxidized elements in the roasted ore.

3. A process for treating arseniureted ores containing various metals including at least one metal from the group consisting of cobalt, nickel, iron and gold, which consists substantially of diffusing chlorine gas into an aqueous suspension of crude arseniureted ore until a large portion of the arsenic and metal in the ore has been dissolved, said chlorine forming hydrochloric acid by its action on the crude ore, thereafter adding previously roasted and oxidized arseniureted ore to the suspension in an amount corresponding substantially to the amount required to react with said hydrochloric acid in solubilizing any oxidized elements in the roasted ore, said hydrochloric acid directly attacking the roasted ore, and continuing the diffusion of chlorine gas into the suspension until substantially all the arsenic and metals in the crude and roasted ores have been dissolved.

4. A process as recited in claim 3 wherein the oxidation potential of the suspension substantially conforms to the curve A, B, C, D, shown in the drawing during the diffusion of the chlorine gas.

5. A process for treatment of arseniureted ores containing various metals including at least one metal from the group consisting of cobalt, nickel, iron, and gold, which consists substantially of diffusing chlorine gas into an aqueous suspension of a mixture of crude arseniureted ore and previously roasted and oxidized arseniureted ore until most of the arsenic and metals in the ore have been dissolved, the proportion of crude ore to roasted ore being such that when the chlorine forms hydrochloric acid by its action on the crude ore the hydrochloric acid is formed in an amount corresponding substantially to the quantity required to solubilize the oxidized elements in the roasted ore, said hydrochloric acid directly attacking the roasted ore, and continuing the diffusion of chlorine gas into the suspension until substantially all of the metal in the mixture has been oxidized and dissolved and substantially all the arsenic has been oxidized into arsenic acid.

6. A process for treating arseniureted ores containing various metals including at least one metal from the group consisting of cobalt, nickel, iron and gold, which comprises diffusing chlorine gas into an aqueous suspension of crude arseniureted ore to cause the following reactions:

$$Cl_2 + H_2O \rightleftharpoons HClO + HCl$$

$$MeAs_n + \frac{3n+2}{2} HClO + \frac{n-2}{2} H_2O \rightleftharpoons$$
$$nHAsO_2 + MeCl_2 + \frac{3n-2}{2} HCl$$

$$HAsO_2 + HClO + H_2O \rightarrow H_3AsO_4 + HCl$$

wherein "Me" represents a metal from the group consisting of cobalt, nickel and iron; adding previously roasted arseniureted ore to the suspension in an amount corresponding substantially to the amount required to react with the hydrochloric acid produced by the above reactions to solubilize any oxidized elements in the roasted ore; and continuing the diffusion of chlorine gas into the suspension until substantially all the arsenic and metals in the crude and roasted ores have been dissolved.

7. A process as recited in claim 3 wherein the oxidation potential of the suspension substantially conforms to the curves A, B, C, D, shown in the drawing during the diffusion of the chlorine gas.

References Cited in the file of this patent

UNITED STATES PATENTS 741,840   Savelsberg -------------- Oct. 20, 1903

UNITED STATES PATENT OFFICE

CERTIFICATE OF CORRECTION

Patent No. 2,829,966                      April 8, 1958

Francis Reynaud et al.

It is hereby certified that error appears in the above numbered patent requiring correction and that the said Letters Patent should read as corrected below.

In the heading to the printed specification, between lines 9 and 10, insert the following:

-- Claims priority, application France April 20, 1955 --.

Signed and sealed this 5th day of August 1958.

(SEAL)
Attest:

KARL H. AXLINE

Attesting Officer

ROBERT C. WATSON
Commissioner of Patents